United States Patent [19]

Hopkins

[11] Patent Number: 4,630,499
[45] Date of Patent: Dec. 23, 1986

[54] SELECTOR MECHANISM FOR AN AUTOMATIC TRANSMISSION VEHICLE

[75] Inventor: Allan S. Hopkins, Coventry, United Kingdom

[73] Assignee: Jaguar Cars Limited, West Midlands, England

[21] Appl. No.: 694,824

[22] Filed: Jan. 25, 1985

[30] Foreign Application Priority Data

Jan. 27, 1984 [GB] United Kingdom ............... 8402164

[51] Int. Cl.⁴ .................... B60K 20/00; G05G 9/00
[52] U.S. Cl. .............................. 74/473 R; 74/566
[58] Field of Search ............... 74/129, 143, 145–147, 74/157–159, 473 R, 473 P, 566

[56] References Cited

U.S. PATENT DOCUMENTS

| 1,037,631 | 9/1912 | Jones ........................... 74/566 |
| 3,082,639 | 3/1963 | Almquist ................... 74/473 R |
| 3,122,941 | 3/1964 | Goldsmith ................. 74/473 P |
| 3,748,923 | 7/1973 | Babbitt et al. ............... 74/566 |
| 3,975,971 | 8/1976 | Radenovic ................. 74/473 R |
| 4,029,324 | 6/1977 | Berkas ........................... 74/566 |
| 4,085,833 | 4/1978 | Papasideris ............... 74/473 R |
| 4,346,618 | 8/1982 | Sakamoto et al. ........ 74/473 R |

FOREIGN PATENT DOCUMENTS

| 34815 | 9/1981 | European Pat. Off. ......... 74/473 R |
| 1104281 | 4/1961 | Fed. Rep. of Germany .... 74/473 R |

Primary Examiner—Lawrence Staab
Attorney, Agent, or Firm—Solon B. Kemon

[57] ABSTRACT

A selector mechanism has an operating member for connecting to a control cable of a gear box, and a gear stick for controlling the movements of the operating member. The mechanism is arranged so that movement of the gear stick around a U-shaped gate produces unidirectional movement of the operating member whereby gears PARK, REVERSE, NEUTRAL and DRIVE can be selected on one leg of the gate and the gear DRIVE, THIRD and SECOND can be selected on the other leg of the gate.

13 Claims, 8 Drawing Figures

SELECTOR MECHANISM FOR AN AUTOMATIC TRANSMISSION VEHICLE

BACKGROUND OF THE INVENTION

This invention relates to a selector mechanism for an automatic transmission vehicle.

Automatic gear boxes are usually controlled by a gear box selector lever the position of which is determined by a gear stick which is moved by the driver and which is connected to the selector lever by a control cable or rod. In known mechanisms, fore and aft movement of the gear stick along a single path produces fore and aft movement of the cable or rod and hence of the selector lever. The gear selection sequence in known mechanisms is PARK (P) at one limit of travel of the gear stick through REVERSE (R), NEUTRAL (N), DRIVE (D), THIRD (3) and SECOND (2) to FIRST (1) at the opposite limit of travel of the gear stick. The gear stick usually extends through a substantially straight slot although notches and/or baulking pins may be provided to reduce the risk of inadvertent selection of the wrong gear by "overshooting" which can be particularly dangerous if N or R is accidentally selected when the gear stick is moved from the lower gears (2 or 3) to D.

SUMMARY OF THE INVENTION

This invention provides a selector mechanism for an automatic transmission vehicle comprising an operating member for attaching to a control cable or rod of an automatic gear box and a control lever arranged to control movement of the operating member, the control lever being moveable along first and second paths which are connected to each other at one end by a connecting path and which extend in substantially the same direction away from the connecting path, the arrangement being such that movement of the control lever along the paths from a remote end of the first path to a remote end of the second path, via the connecting path, produces uni-directional movement of the operating member.

Preferred features of this invention are detailed in the dependent claims of the specification.

BRIEF DESCRIPTION OF THE DRAWINGS

A selector mechanism according to this invention will now be described, merely by way of example, with reference to the accompanying drawings, in which.

DESCRIPTION OF A PREFERRED EMBODIMENT

Reference to directions such as fore and aft, up and down, etc. in the folliwng description relate to directions shown in the drawings, but it will be appreciated that these directions usually correspond to similar directions in a vehicle.

Figures 5, 6A:
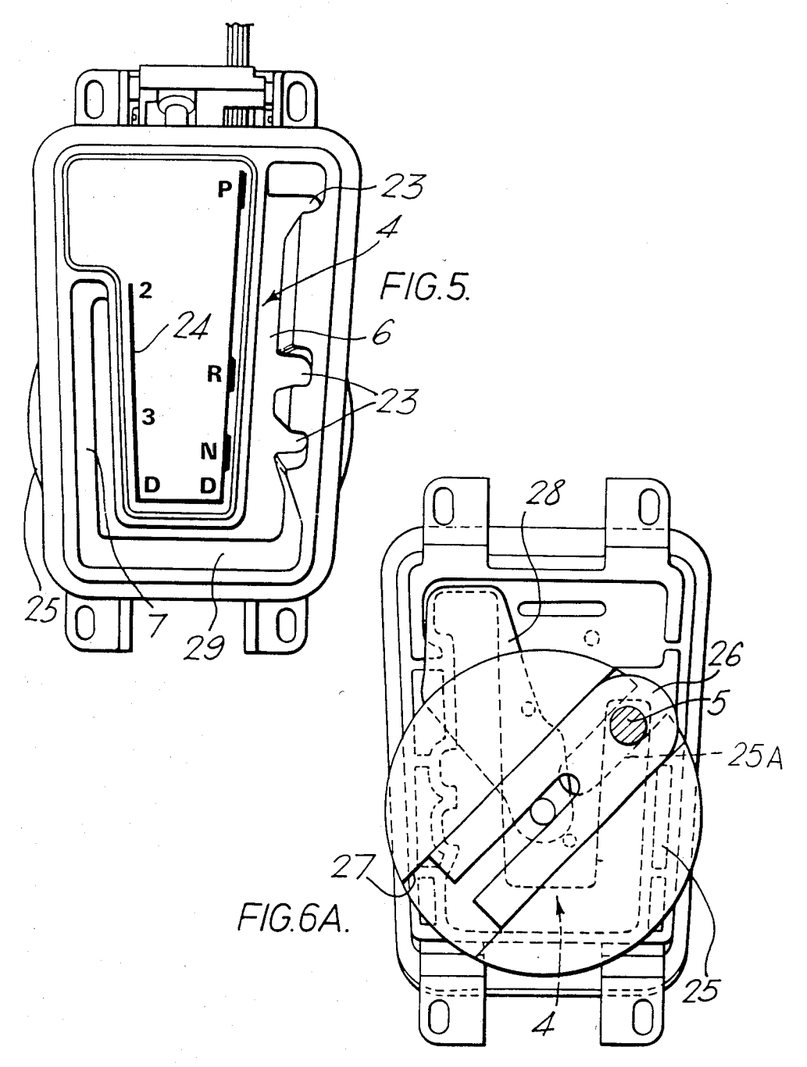
FIG. 5 is a plan view of the selector mechanism of FIG. 1 showing the selector gate thereof (the control lever has been omitted for clarity)
FIGS. 6A and 6B are bottom plan views of the selector gate of FIG. 5 showing two positions of a seal for occluding a slot in the selector gate.

FIG. 5 will first be described to indicate the manner in which the illustrated embodiment is designed to be used. As FIG. 5 shows, the selector mechanism has a J-shaped gate 4 through which a gear stick or centre lever 5 (see other Figures) extends. The gate 4 constrains the manner in which the gear stick 5 can be moved. The gears P, R, N and D may be selected on the longer leg or path 6 of the gate, these being the gears used during a "normal" run, i.e. a run when the automatic transmission is relied upon to select the appropriate gear. The gears 2, 3, and D may be selected on the shorter leg or path 7 of the gate 4, these being the gears used during a "high-speed" run, i.e. a run when the driver wishes to override the automatic selection of gears and select gears according to his personal style of driving. The arrangement of gears can, of course, be altered and it could, for instance, be such that gears 1, 2, 3 and D are selected on the shorter leg 7 of the gate 4. An advantage of the illustrated layout of the gate 4 is immediately apparent as it is impossible for the driver to "overshoot" the position D when changing up from 2 or 3. Instead a conscious effort is required to move the gear stick 5 along a connecting path 29 from the shorter leg 7 of the gate 4 to the longer leg 6 before the gears N, R, or P can be selected. It will be appreciated that no gear change occurs when the gear stick 5 is moved from D in the longer leg 6 of the gate 4 to D in the shorter leg 7 or vice versa.

Figure 1:
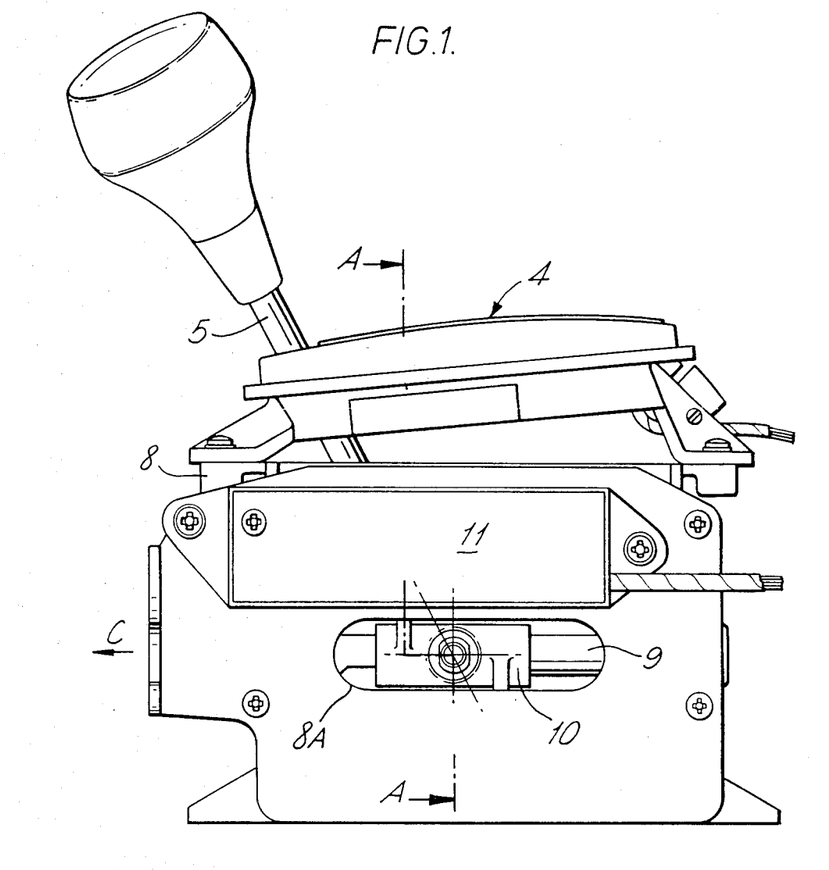
FIG. 1 is a side view of an embodiment of a selector mechanism according to the present invention.

FIG. 1 shows a side view of an embodiment of a selector mechanism according to the present invention. This figure shows a casing 8 on which the gate 4 is mounted. A shaft 9 attached to a side wall of the casing 8 carries an operating member 10 which is slideable along the shaft 9 and a portion of which extends through a slot 8A in the side wall of the casing. In use, a cable or rod (not shown) extending in the direction shown by arrow C would be attached to the portion of the operating member 10 which extends through the slot 8A so that movement of the operating member 10 controls movement of the cable or rod (not shown) and hence movement of a selection lever of a gear box (not shown). Movement of the operating member 10 is controlled by movement of the gear stick 5 in a manner which will become clear from the following description. Movement of the gear stick 5 also controls a switch 11 which provides signals to other parts of the vehicle as to the position of the gear stick 5. These signals may be used to control the vehicle in a variety of ways. For instance, starting of the engine can be inhibited unless gears P and N are selected, reversing lights can be activated when the gear R is selected, and a warning can be given if the gear P is not selected when a door of the vehicle is opened or the engine is turned off. The signals from the switch 11 can also be used to govern engine speed and automatic selection of gears, to govern the operation of a fuel injection system, and to monitor the condition of various components, for instance of the clutch system. Such functions may, of course, be controlled in conjunction with a computer system of the vehicle.

It will be seen from FIG. 1 that the gate 4 is inclined to the horizontal. This inclination reduces the relative movement in a direction parallel to the axis of the gear stick 5 between the gear stick 5 and the gate 4 as the gear stick 5 is moved fore and aft in the gate 4. It also renders the upper surface of the gate 4 more clearly visible to the driver of the vehicle. Because the upper surface of the gate 4 is inclined to the horizontal, it is necessary for the two legs of the gate to be inclined to the perpendicular to the connecting path, i.e. to form a channel shape with the sides of the channels divergent, because the plane swept out by the gear stick 5 as it is moved along either leg is inclined to the vertical.

Figure 2:
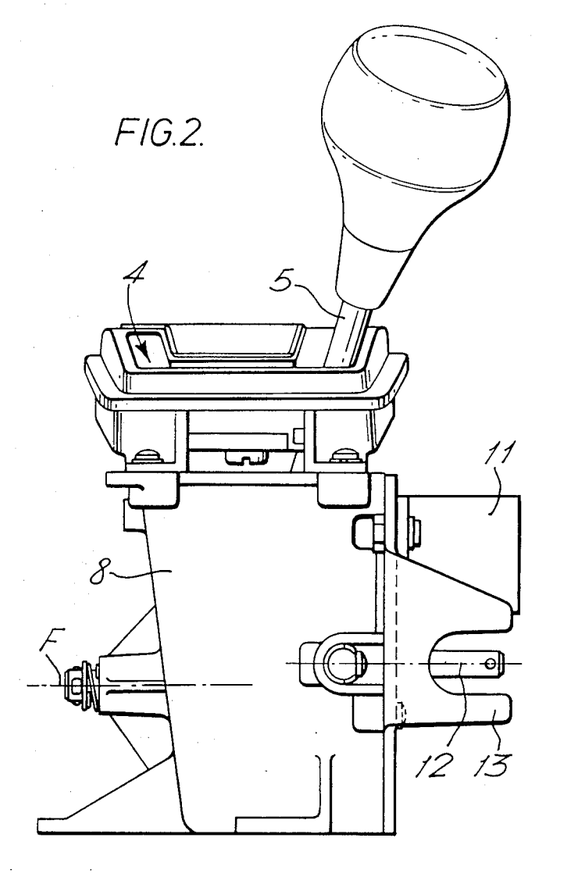
FIG. 2 is a rear view of the selector mechanism of FIG. 1.

FIG. 2 shows a rear view of the selector mechanism shown in FIG. 1. This figure shows the gear stick 5 extending through the gate 4, the gear stick being in the D position in the longer leg 6 of the gate as shown in FIG. 5. FIG. 2 also shows a rod 12 which is attached to the operating member 10. In use, the operating cable or rod (not shown) of a gearbox would be attached to the rod 12 and an outer casing of the cable or rod would be clamped to bracket 13 attached to the casing 8.

Figure 3:
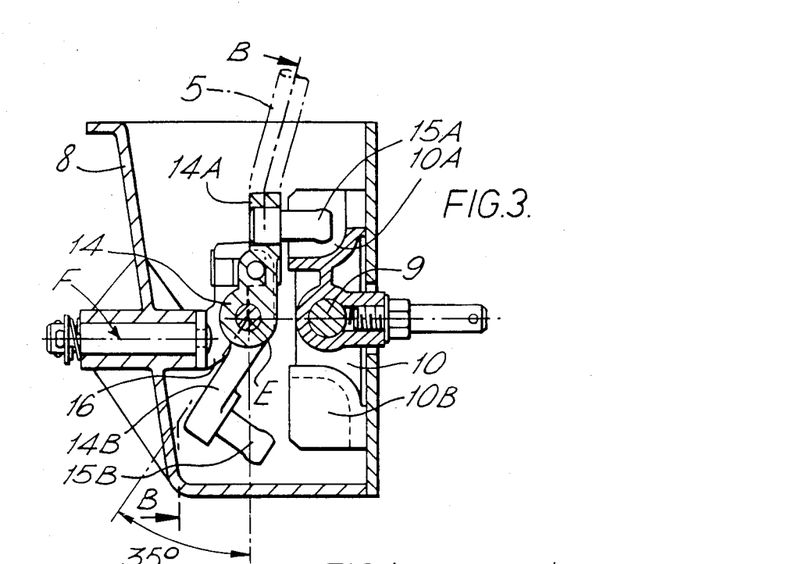
FIG. 3 is a cross sectional view on the selector mechanism with the gate removed from the casing taken on the line A—A shown in FIG. 1.

FIG. 3 shows the operating parts of the selector mechanism which transfer the movement of the gear stick 5 to the operating member 10. The gear stick 5 is only partly shown in this figure for clarity. A drive member 14 is rigidly attached to the gear stick or forms an integral part thereof, and the gear stick 5 and drive member 14 are pivotable about an axis E which in the position shown extends in a direction perpendicular to the plane of the paper. The drive member 14 comprises two limbs 14A and 14B which are inclined at an angle of 35° to each other. The limbs 14A and 14B respectively carry pegs 15A and 15B which project at right angles therefrom. FIG. 3 also shows that the operating member 10 has two sockets 10A and 10B into which the pegs 15A and 15B respectively can be inserted. In the position shown, peg 15A is inserted into socket 10A and the gear stick 5 is positioned in the longer leg 6 of the gate 4. In the position shown, with the axis E lying parallel to the direction C, i.e. the direction parallel to the axis of the shaft 9, the gear stick 5 is positioned at the most rearward point of the longer leg 6 of the gate 4, i.e. in a position corresponding to the gear D.

When the gear stick 5 is in the position shown in FIG. 3, it can be moved to the left, across the gate 4, to the shorter leg 7 of the gate 4. As the gear stick 5 is moved to the left, the peg 15A is withdrawn from the socket 10A and the peg 15B enters the socket 10B as the drive member 14 pivots anti-clockwise about the axis E. It is desirable that the axis E lies parallel to the shaft 9, as described above, during this motion of the gear stick 5 as otherwise the pivoting of the drive member 14 about the axis E would cause fore and aft movement of the pegs 15A and 15B. Such fore and aft movement would require clearances to be provided between the pegs 15A and 15B and their respective sockets 10A and 10B and this would cause "play" in the mechanism. As shown in FIG. 3, the drive member 14 and the gear stick 5 are pivotably mounted on a pivot member 16 so as to be pivotable about the axis E. The pivot member 16 is itself pivotably mounted to the casing 8 so as to be pivotable about an axis F which lies in the plane of the paper and is perpendicular to the axis of the shaft 9.

When the gear stick 5 is in the position shown in FIG. 3 it can be moved forward along the longer leg 6 of the gate 4 towards the positions N, R and P. During this movement, the gear stick 5, the drive member 14 and the pivot member 16 together rotate about the axis F. As the drive member 14 is thus rotated about the axis F, the peg 15A in the socket 10A pushes the operating member 10 forwards so that it slides along the shaft 9 in the direction opposite to the arrow C. As will be seen in the figure, the peg 15A is arranged to lie parallel to the axis F when it is located in the socket 10A and it remains parallel with this axis as the gear-stick 5 is moved along the longer leg 6 of the gate. Peg 15B is similarly arranged when it is located in the socket 10B and when the gear-stick is moved along the shorter leg 7 of the gate. Angular movement of the pegs 15A and 15B within the sockets 10A and 10B is thereby avoided. By pulling the gear stick 5 back, the drive member 14 is rotated in the opposite sense about the axis F and the peg 15A in the socket 10A pushes the operating member 10 in the direction of the arrow C back to the position corresponding to the gear D. It will be appreciated that axis E is at all times perpendicular to axis F.

To select gears 3 or 2, the gear stick is moved from the position shown in FIG. 3 along the connecting path 29. As described above, the gear stick 5 and drive member 14 rotate about the axis E as the gear stick 5 is moved from the D position in the longer leg 6 of the gate 4 to the D position in the shorter leg 7. No rotation of the drive member 14 about the axis F occurs during this movement so the pegs 15A and 15B do not move the operating member 10 along the shaft 9. When the gear stick 5 is in the D position of the shorter leg 7, the peg 15B is positioned within the socket 10B and the peg 15B is withdrawn from the socket 10A. Thus, if the gear stick 5 is now pushed forward along the shorter leg 7 towards the gears 3 and 2, the gear stick 5, the drive member 14 and the pivot member 16 together rotate about the axis F. As the drive member 14 is thus rotated, the peg 15B in socket 10B pushes the operating member 10 in the direction of arrow C. By pulling the gear stick 5 back, the drive member 14 is rotated in the opposite sense about the axis F and the peg 15B in the socket 10B pushes the operating member 10 in the direction opposite to arrow C back to the position corresponding to the gear D.

It will thus be seen that movement of the gear stick 5 from the position P in the longer leg 6 to the position D in the same leg causes peg 15A to push the operating member 10 in the direction of arrow C, movement of the gear stick 5 along the connecting path 29 from the longer leg 6 to the shorter leg 7 disengages peg 15A from socket 10A and engages peg 15B with socket 10B but causes no movement of the operating member 10, and movement of the gear stick 5 from the position D in the shorter leg 7 to the position 2 in the shorter leg 7 causes peg 15B to push the operating member 10 further in the direction of arrow C. It will therefore be seen that movement of the gear stick 5 from the remote end of one leg of the J-shaped gate to the remote end of the other leg of the J-shaped gate, via the connecting path, produces uni-directional movement of the member 10. Rotation of the operating member 10 on the shaft 9 as it moves along the shaft 9 is prevented since a part of the walls of each socket 10A and 10B is located against the side wall of the casing 8. Movement of the operating member 10 also controls the setting of switch 11 which may be a sliding switch. A peg and socket mechanism (not shown) may be used to transfer movement of the operating member 10 to the switch 11.

Figure 4:
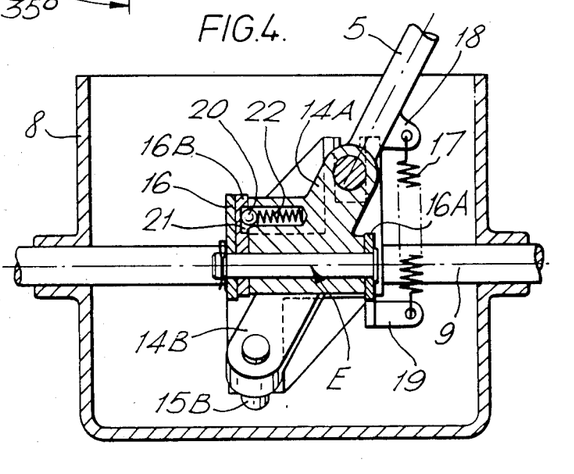
FIG. 4 is a cross sectional view of the selector mechanism taken on the line B—B shown in FIG. 3.

FIG. 4 shows that a spring 17 is attached between a tab 18 connected to the gear stick 5 and a tab 19 connected to a plate 16A carried by the pivot member 16. The spring 17 acts to bias or to urge the gear stick 5 and hence the drive member 14 to rotate about the axis E to the D position in the longer leg 6 of the gate 4. However, the spring 17 is arranged so that when the gear stick 5 is in the position D in the shorter leg 7 its line of action is co-planar with the axis E so that in this position there is no moment tending to rotate the gear stick 5 about the axis E. Thus, when the gear stick 5 is in the D position in the shorter leg 7 it is in a position of unstable equilibrium with respect to the spring 17. FIG. 4 also shows, however, that the selector mechanism is provided with a device for temporarily holding the gear stick 5 in the D position in the shorter leg 7 and which acts between the drive member 14 and the pivot member 16. This device comprises a ball 20 which is carried by the drive member 14 and is urged by a spring 22 towards a corresponding slot 21 in a change-over plate 16B carried by the pivot member 16. The slot 21 is provided with a recess which is aligned with the ball 20 when the gear stick 5 is in the D position in the shorter leg 7. To move the gear stick 5 out of this position the ball 20 has to be lifted out of the recess against the force of the spring 22 so that it can slide within the slot 21 as the gear stick 5 is moved along the connecting path 29. The ball moves out of the recess automatically as the gear stick 5 is moved out of the D position in the shorter leg 7 along the connecting path 29 but the resistant force provided by the spring 22 has to be overcome before this movement occurs. Thus, a positive effort is required to move the gear stick 5 out of the shorter leg 7.

As FIG. 5 shows, the longer leg 6 of the gate 4 is provided with notches at positions corresponding to the gears N, R, and P. When the gear stick 5 is in alignment with a notch it is allowed to enter it by means of a further slight rotation of the drive member 14 about the axis E under the action of the spring 17. This rotation does not, of course, produce any movement of the operating member 10. Similar notches could also be provided on the right hand side of the shorter leg 7 of the gate 4 at positions corresponding to the gears 3 and 2. Although such notches aid in the accurate selection of a gear they are not essential. Other mechanisms could, of course, be provided for temporarily holding the gear stick 5 in positions corresponding to the various gears. FIG. 5 also shows that the gate 4 is provided with an indication 24 of the gears selected at the various positions around the gate 4. The indications 24 may be illuminated and means may be provided for illuminating the selected gear in a colour different from the other gears.

Figure 6B:
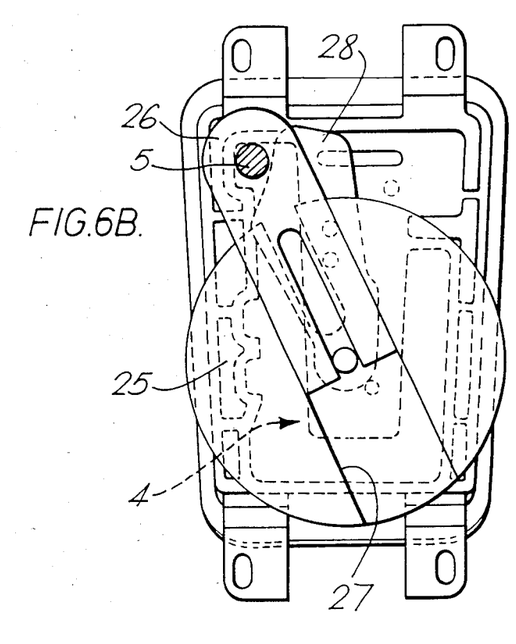
Figure 6C:
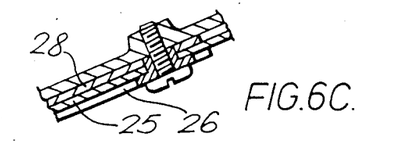
FIG. 6C is a cross-sectional view of the seal shown in FIGS. 6A and 6B.

FIGS. 6A, 6B and 6C illustrate a seal mechanism which is provided to provide a barrier and prevent dust and debris passing through the slot in the gate 4. The seal mechanism comprises a disc 25 having a slot 25A extending radially from its periphery rotatably mounted at its centre just below the gate 4, a sliding member 26 which is arranged to slide in a groove 27 co-axial with slot 25A and extending along a diameter of the disc 25 and parallel with slot 25A, and a covering member 28 which is also rotatably mounted at the centre of the disc 25 and extends radially beyond it. The gear stick 5 passes freely through a hole in one end of the sliding member 26 and through the slot 25A. As gears 2, 3, D, N, or R are selected the disc 25 is rotated and the sliding member 26 slides in the groove 27 and slot 25A so that the hole in the sliding member 26 through which the gear stick 5 passes is aligned with the various positions around the gate 4. Relative sliding movement of the sliding member 26 in the groove 27 accommodates the substantially linear movement of the gear stick 5 along the paths in the gate 4. The disc 25 and sliding member 26 together occlude the portion of the slot in the gate 4 not occupied by the gear stick 5 between the gears 2 and R as the gear stick 5 is moved between these gears. When the gear stick 5 is in these positions the remote end of the longer leg 6 of the gate 4 not covered by the disc 25 is occluded by the covering member 28 as shown in FIG. 6A, the covering member 28 being urged towards this position by spring means which are not illustrated. When the gear stick 5 is moved towards the P position in the longer leg 6, it pushes the covering member 28 to one side and the sliding member 26 slides along the groove 27 to occlude the portion of the longer leg 6 beyond the periphery of the disc 25 as shown in the position illustrated in FIG. 6B.

It will be appreciated that the gate 4 may have a variety of shapes, such as a J-shaped (as illustrated), a Ushape and a substantially V-shape, in which two legs or paths extend in substantially the same direction away from a connecting path joining them at one end. Thus, the two legs or paths may be the same length or of different lengths, may be parallel or may be inclined to each other by a small angle, and may lie perpendicular to the connecting path or may lie at a small angle to the perpendicular. The gate does not need to be in the form of a slot but could be any mechanism which constrains movement of the gear stick along predetermined paths. The positions around the gate corresponding to the various gears, and the number of gears, can, of course, be altered although they should comply with any regulations in force in the countries of use.

Other types of driving means such as a gear mechanism may be used in place of the illustrated peg and socket mechanism. It would also be possible to provide other types of pivot and lever arrangement in place of the particular arrangement described for transferring movement of the gear stick to the operating member.

The positions corresponding to the various gears are well spaced from each other in the illustrated selector mechanism although the gear stick is relatively short.

This is because the shape of the gate allows the length of the path around the gate to be increased without the need to increase the length of the gear stick. The distance moved by the gear stick in the illustrated embodiment between one end thereof and the other end thereof may be twice that moved by a gear stick of similar length in a conventional mechanism using a substantially straight gate. This not only assists in accurate positioning of the gear stick in positions corresponding to the various gears, but also reduces the effort required by the driver to move the gear stick.

The bias spring provided to urge the gear stick from the shorter leg 7 towards the longer leg 6 may in an alternative construction urge the gear stick the opposite way.

The illustrated mechanism can be designed to be compatible with a conventional automatic gear box which requires linear movement of the control cable or rod to effect gear changes. Thus, movement of the operating member in the described mechanism may be arranged to be linear with respect to the distance moved by the gear stick around the gate.

The separation of the various gears required in the two modes of driving described in relation to FIG. 5 onto the respective legs of the gate enables the driver to simply select the mode in which he wishes to drive by positioning the gear stick in the appropriate leg of the gate. Moreover, if the "high-speed" mode is selected, the driver is able to change between gears 3 and D and gears 3 and 2 without needing to observe the gear stick, and hence to stop looking at the road, as the gear stick needs only to be pushed as far forward as possible or as far back as possible in the appropriate leg from a central point to select the gears 2 and D.

I claim:

1. A selector mechanism for an automatic transmission comprising in combination a longitudinally movable operating member for operative attachment to an automatic gearbox, a control lever pivotable about a first, transverse, axis and a second, longitudinal, axis and arranged to control movement of the operating member, guide means for said control lever defining first and second generally longitudinally extending paths, an interconnection between the paths at one end of each path such that the paths extend generally in the same direction from said interconnection, a first driving means and a second driving means each operatively connected to the control lever on opposite sides of said first axis such that generally longitudinal movement of the control lever along one of said first and second paths produces corresponding movement of said first and second driving means in mutually opposite generally longitudinal directions, a first driven means and a second driven means operatively connected to said operating member, said first driving means being moved into operative engagement with said first driven means in response to positioning said control lever in said first path and said second driving means being moved into operative engagement with said second driven means in response to positioning said control lever in said second path whereby movement of the control lever from a position remote from the interconnection on the first path, along said first path towards said interconnection causes movement of the operating member in one direction and thereafter movement of the control lever along said second path away from said interconnection causes further movement of the operating member in the same direction.

2. A selector mechanism as claimed in claim 1 wherein said interconnection is a transverse connecting path and movement of the control lever along the interconnection produces no movement of the operating member.

3. A selector mechanism as claimed in claim 2 wherein the first path, the second path and the connecting path together form a U-shaped path.

4. A selector mechanism as claimed in claim 2 wherein the first path, the second path and the interconnection path together form a substantially J-shaped path.

5. A selector mechanism according to claim 2 wherein biasing means are provided arranged to bias the control lever towards one of the first path and the second path when the lever is located in the interconnection.

6. A selector mechanism according to claim 2 wherein the control lever is movable into a number of different positions, the positions following the sequence PARK, REVERSE, NEUTRAL and DRIVE when the lever is moved from the remote end of the first path to the interconnection and following the sequence DRIVE, THIRD and SECOND when the control lever is moved from the connecting path to the remote end of the second path.

7. A selector mechanism as claimed in claim 1 wherein the first path, the second path and the interconnection together form a substantially V-shaped path.

8. A selector mechanism according to claim 1 wherein each driving means comprises a peg and each driven means comprises a corresponding socket for driving engagement therewith.

9. A selector mechanism according to claim 1 wherein the gate is provided with notches at positions corresponding to gear positions along the first and second paths the control lever being engageable with the said notches.

10. A vehicle having a selector mechanism as claimed in claim 1.

11. A selector mechanism according to claim 1 wherein said second axis is pivotable about said first axis and wherein said second axis lies parallel to said longitudinal movement of the operating member when said control lever is at said interconnection.

12. A selector mechanism for an automatic transmission comprising in combination a longitudinally movable operating member for operative attachment to an automatic gearbox, a control lever pivotable about a first, transverse, axis and a second, longitudinal, axis and arranged to control movement of the operating member, guide means for said control lever defining first and second generally longitudinally extending paths, an interconnection between the paths at one end of each path such that the paths extend generally in the same direction from said interconnection, a first driving means and a second driving means each operatively connected to the control lever on opposite sides of said first axis such that generally longitudinal movement of the control lever along one of said first and second paths produces corresponding movement of said first and second driving means in mutually opposite generally longitudinal directions, a first driven means and a second driven means operatively connected to said operating member, said first driving means being moved into operative engagement with said first driven means in response to positioning said control lever in said first path and said second driving means being moved into operative engagement with said second driven means in response to positioning said control lever in said second path whereby movement of the control lever from a position remote from the interconnection on the first path, along said first path towards said interconnection causes movement of the operating member in one direction and thereafter movement of the control lever along said second path away from said interconnection causes further movement of the operating member in the same direction, wherein said interconnection is a transverse connecting path and movement of the control lever along the connecting path produces no movement of the operating member, wherein the first path, the second path and the connecting path are incorporated in a gate for constraining the movement of the control lever and wherein the operating member and associated mechanism are disposed in the casing, a seal mechanism being provided between the gate and casing comprising a disc rotatably mounted on the gate to provide a barrier, the disc having a groove extending along a diameter thereof and within which there is slidably retained a sliding member, one end of the control lever passing freely through a hole in the sliding member and through a slot in the disc coaxial with the groove, the arrangement being such that during the control lever movement along the said paths the disc is rotated thereby by engagement with the sliding member with the groove, relative movement of the sliding member in the groove accommodating the substantially linear movement of the lever along the said paths.

13. A selector mechanism as claimed in claim 12 wherein the seal mechanism includes a covering member rotatably mounted co-axially with the disc and extending radially beyond the disc, spring means being provided to urge the covering member to seal a portion of the space between the gate and casing, the covering member being engageable by the control lever to move the member against the spring means to allow movement of the member during operation of the selector mechanism.

* * * * *